Figure 1:
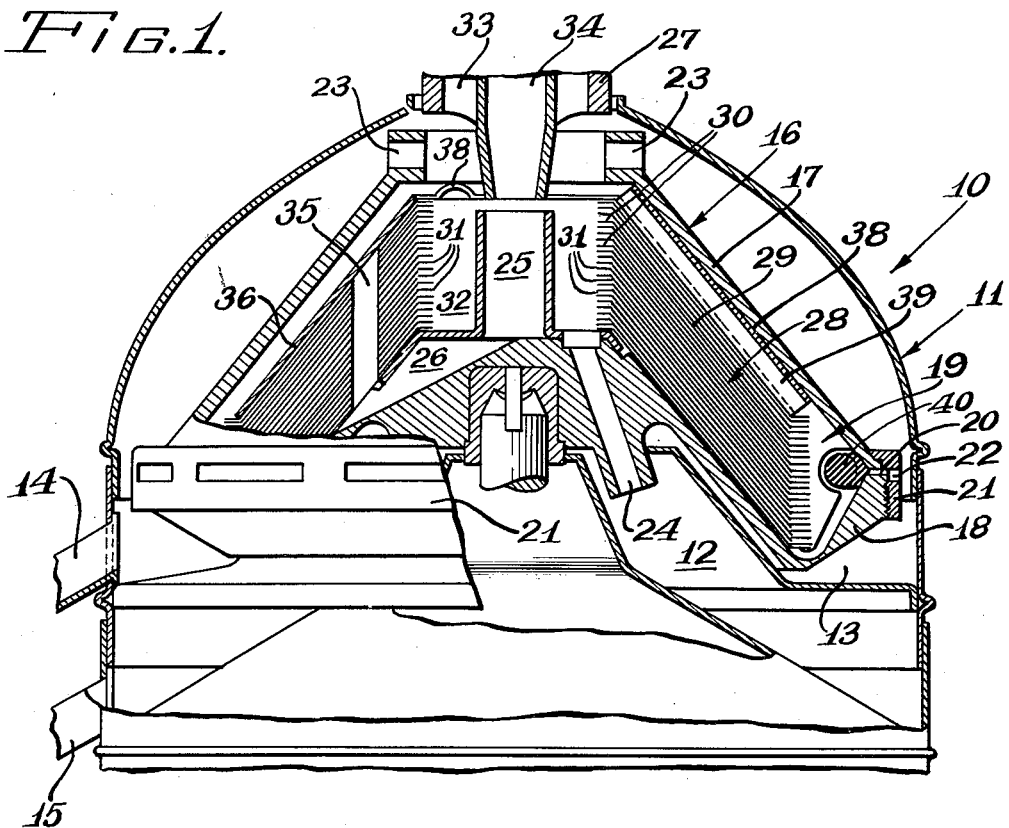

March 20, 1956 W. H. HARSTICK 2,738,923
COMPRESSION DISK ASSEMBLY FOR POWER WASHING CREAM SEPARATORS
Filed Sept. 21, 1954

Inventor:
William H. Harstick
By Paul O. Pippel
Atty.

United States Patent Office 2,738,923
Patented Mar. 20, 1956

2,738,923

COMPRESSION DISK ASSEMBLY FOR POWER WASHING CREAM SEPARATORS

William H. Harstick, Oak Park, Ill., assignor to International Harvester Company, a corporation of New Jersey Application September 21, 1954, Serial No. 457,443

4 Claims. (Cl. 233—41)

This invention relates to an improvement in cream separators. More specifically the invention relates to an improved compression disk for centrifugal cream separator bowls.

Centrifugal cream separator bowls generally include a plurality of superposed frusto-conical disks which are assembled in compacted relation within the chamber of the separating bowl. Each of the disks may include suitable spacer members whereby the disks may be maintained in relatively separate vertically spaced relation despite the compacting of the disk pack within the bowl. The compacting of the disks within the bowl suitably positions them in proper relation so that the spaces within the disks are maintained with relative accuracy. In general the uppermost disk of the disk pack is considered the compression disk. The compression disk generally is suitably spaced from the upper casing part of the bowl in order to permit the escape of skim milk to the skim milk discharge opening of the bowl. The spacer members on the compression disk however serve to compress the disk pack during the connection of the upper and lower casing members of the bowl in assembled relation. Spacer members situated on the compression disk have been found in certain instances to straight impede the flow of the skim milk to the discharge outlets. Furthermore, the spacer members have been found to require excessive cleaning since they present obstructions to the proper flow of the skim milk to the respective outlets. In a power washing cream separator it is exceedingly important to eliminate, if possible, any obstructions which might tend to form pockets which are difficult to clean during the power washing operation of the separating bowl. It is a prime object of this invention therefore to provide an improved compression disk for suitably compacting the disk pack within a power washing cream separator bowl.

Another object is to provide an improved compression disk for a cream separator disk pack, the compression disk including resilient portions which are adapted to resiliently compress or compact the separating disk pack within the bowl.

A still further object is to provide an improved compression disk for a power washing cream separator bowl, the compression disk including a plurality of resilient arcuate wall sections adapted to resiliently compress or compact the separating disks with the bowl, the arcuate sections being so disposed as to provide a minimum of interference for the flow of the skim milk to the skim milk outlets of the bowl.

Another object is to provide a resilient top disk for centrifugal separators which is adapted to compress the disks of a disk pack assembly despite variations in the thickness of the disks as a result of manufacturing tolerances.

These and further objects will become more readily apparent from a reading of the specification when examined in connection with the accompanying sheet of drawing.

Figure 2:
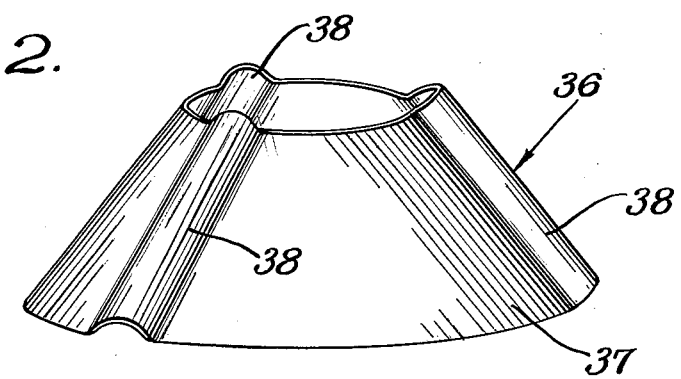

In the drawing:

Figure 1 is a side elevational view of a centrifugal separator showing portions of a separating bowl broken away to disclose the interior parts of the bowl; and Figure 2 is an enlarged perspective view of a compression disk for a disk pack shown in the separating bowl of Figure 1.

A centrifugal separator is generally indicated at 10. The separator 10 includes a tin ware structure 11 having a cream receiving chamber 12 and a skim milk receiving chamber 13. Discharge spouts 14 and 15 are respectively in communication with the chambers 12 and 13.

A separating bowl is generally designated by the reference character 16. The bowl 16 comprises an upper casing member 17 and a lower casing member 18 connected together to form a separating chamber 19. The outer peripheral portions of the casing members 17 and 18 are connected together to provide a plurality of discharge openings indicated at 20. The casing members 17 and 18 are suitably connected together by an annular connecting ring 21 which serves to securely draw the casing members 17 and 18 together in assembly. The connector ring 21 includes a plurality of discharge openings 22 in registry with the openings 20.

The upper casing member 17 includes a plurality of skim milk outlets 23 and the lower casing member 18 includes a cream outlet 24 in communication with the chamber 12. The lower casing member 18 is provided with an upwardly extending feed tube 25 in communication with a distributor chamber or space 26. A milk and wash water supply tube is indicated at 27.

A disk pack situated within the chamber 19 is designated at 28. The disk pack 28 comprises a plurality of separating disks 29 the said disks being of a frusto-conical shape. Each separating disk 29 includes an inner flat wall portion 30 apertured to provide an opening 31. As indicated in Figure 1 the openings 31 are in alignment to provide a receiving space 32. The supply tube 27 includes a washing liquid supply passage 33 in communication with the space 32. Likewise the feed tube 25 is in vertical registry with a milk supply passage 34 in the supply tube 27.

Each frusto-conical disk 29 is provided with an opening 35 laterally disposed with respect to the opening 31. The openings 35, in the superposed relation of the separating disk 29, are in registry or vertical alignment to provide a suitable passage in communication with the distributor space 26. Generally a plurality of these passages and chambers 26 are provided in circumferentially spaced relation only one of such passages and chambers being shown in the present disclosure.

A top or compression disk 36 is best shown in Figure 2. The compression disk 36 comprises a frusto-conical wall 37 of similar shape and design as the separating disks 29. The frusto-conical wall 37 includes a raised or projecting wall section of arcuate shape as indicated at 38. The wall sections 38 are integrally formed in the wall 37 by suitable forming or drawing. Since the wall sections 38 are relatively thin and the disks are generally made of stainless steel material the wall sections 38 provide an inherent resiliency which is most desirable in a compression disk.

During the assembly of parts, the compression disk 36 is placed on top of the uppermost separating disk 29 as indicated in Figure 1. The compression disk 36 forms with the uppermost separating disk a plurality of passages 39, these passages 39 of course being circumferentially disposed and also being coextensive with the wall 37. During assembly, the upper casing member 17 is now placed over the disk pack 28 and the connecting ring 21 firmly connects the casing members in assembly. The upper casing member 17 is thus forced downwardly in tight relation against the arcuate wall sections 38 whereby, as a result of the resiliency of the said wall sections 38, the disk pack 28 is firmly compacted within the separating chamber 19. As indicated above, the separating disks 29 are provided with the conventional spacers (not shown) which will permit the disks to be maintained in relatively vertically spaced relation so that the whole milk which is supplied to the passage 35 can be properly separated between the separating disks.

The separating operation of the whole milk is otherwise conventional as well known to those skilled in the art, and the skim milk which is delivered to the outermost peripheral edges of the disks is directed upwardly between the compression disk and the inner surface of the upper casing member 17, this skim milk being then discharged through the outlets 23. On the other hand the cream enters into the chamber 32 and is discharged through the outlets 24. It can be seen that the arcuate sections 38 are effective to resiliently compact the disk pack. Furthermore, by virtue of the shape of these sections 38 the skim milk flow is unimpeded and thus power washing of the compression disk is a simple matter. During the power washing operation, washing liquid is directed to the space 32, this washing liquid being centrifugally forced between the separating disks and upwardly along the inner wall of the upper casing member 17. At certain intervals a ring valve 40 opens to permit the flushing or discharge of the washing liquid through the openings 20 and 22. Further operation of the power washing feature need not be described but it can be seen that the shape of the wall sections 38 is such that an unimpeded flow of washing liquid can occur whereby the top compression disk is effectively cleansed. Thus proper cleaning takes place and the growth of bacteria is greatly eliminated. This is extremely important in power washing cream separators which may not be hand washed for long periods of time.

Thus it can be seen that an improved cream separator bowl and compression disk assembly have been described. It must be understood that changes may be made in this construction without departing from the spirit of the invention or the scope of the appended claims.

What is claimed is:

1. For a centrifugal separating bowl having upper and lower casing members separably connected together to provide a separating chamber; a separating disk pack comprising a plurality of frusto-conical separating disks, each disk having a substantially flat inner wall portion extending transversely with respect to the axis of the disk and having a substantially centrally disposed opening, said disks being disposed within the chamber in superposed relation with the openings in aligned relation to provide a central liquid receiving space, a compression disk seated on the uppermost disk of the disk pack, said compression disk having a frusto-conical wall provided at its upper extremity with a centrally disposed opening, a plurality of circumferentially disposed upwardly projecting resilient arcuate wall sections on said wall providing with the uppermost disk of the pack a plurality of circumferentially disposed passages coextensive with said wall, said arcuate wall sections engaging the upper casing member whereby a resilient axial pressure is exerted by said compression disk against said frusto-conical disks to resiliently compact the same within said chamber.

2. For a centrifugal separating bowl having upper and lower casing members separably connected together to provide a separating chamber; a separating disk pack comprising a plurality of frusto-conical separating disks, each disk having a substantially centrally disposed opening, said disks being disposed within the chamber in superposed relation with the openings in aligned relation to provide a central liquid receiving space, a compression disk seated on the uppermost disk of the disk pack, said compression disk having a frusto-conical wall provided at its upper extremity with a centrally disposed opening, a plurality of circumferentially disposed upwardly projecting resilient wall sections on said wall providing with the uppermost disk of the pack a plurality of circumferentially disposed passages coextensive with said wall, said wall sections engaging the upper casing member whereby a resilient axial pressure is exerted by said compression disk against said frusto-conical disks to resiliently compact the same within said chamber.

3. For a centrifugal separating bowl having upper and lower casing members connected together to provide a separating chamber; a separating disk pack comprising a plurality of frusto-conical separating disks, each disk having a substantially centrally disposed opening, said disks being disposed within the chamber in superposed relation with the openings in aligned relation to provide a central liquid receiving space, a compression disk seated on the uppermost disk of the disk pack, said compression disk having a frusto-conical wall provided at its upper extremity with a centrally disposed opening, a plurality of upwardly projecting arcuate integral wall sections on said wall providing with the uppermost disk of the pack a plurality of circumferentially disposed passages coextensive with said wall, said wall sections engaging the upper casing member whereby a resilient axial pressure is exerted by said compression disk against said frusto-conical disks to resiliently compact the same within said chamber.

4. For a centrifugal separating bowl having upper and lower casing members connected together to provide a separating chamber; a separating disk pack comprising a plurality of frusto-conical separating disks, each disk having a substantially centrally disposed opening, said disks being disposed within the chamber in superposed relation with the openings in aligned relation to provide a central liquid receiving space, a compression disk seated on the uppermost disk of the disk pack, said compression disk having a frusto-conical wall provided with a centrally disposed opening, a plurality of projecting wall sections on said wall providing with the uppermost disk of the pack a plurality of circumferentially disposed passages, said wall sections engaging the upper casing member for suitably spacing the compression disk from said upper casing member whereby a resilient axial pressure is exerted by said compression disk against said frusto-conical disks to resiliently compact the same within said chamber.

References Cited in the file of this patent

UNITED STATES PATENTS

| 463,794 | De Laval | Nov. 24, 1891 |
| 817,465 | Bragg | Apr. 10, 1906 |
| 894,855 | Richmond | Aug. 4, 1908 |

FOREIGN PATENTS

| 251,260 | Germany | Sept. 28, 1912 |